United States Patent
Effenberger

(10) Patent No.: US 8,824,889 B2
(45) Date of Patent: Sep. 2, 2014

(54) HIGH CAPACITY OPTICAL FREQUENCY DIVISION MULTIPLE ACCESS PASSIVE OPTICAL NETWORK

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1753 days.

(21) Appl. No.: 11/852,472

(22) Filed: Sep. 10, 2007

(65) Prior Publication Data

US 2008/0085118 A1 Apr. 10, 2008

Related U.S. Application Data

(60) Provisional application No. 60/828,115, filed on Oct. 4, 2006.

(51) Int. Cl.
H04J 14/00 (2006.01)
H04J 14/02 (2006.01)

(52) U.S. Cl.
CPC .................. *H04J 14/0282* (2013.01)
USPC ........................................... 398/67

(58) Field of Classification Search
CPC .................................. H04J 14/0282
USPC ..................... 398/67, 95, 162, 187
See application file for complete search history.

(56) References Cited

U.S. PATENT DOCUMENTS

| | | | |
|---|---|---|---|
| 5,896,211 A * | 4/1999 | Watanabe ......................... 398/76 |
| 6,417,942 B1 * | 7/2002 | Seto et al. .......................... 398/5 |
| 6,870,836 B1 * | 3/2005 | Dyke et al. ..................... 370/355 |
| 7,421,204 B2 * | 9/2008 | Jennen ............................. 398/77 |
| 7,428,385 B2 * | 9/2008 | Lee et al. ........................ 398/100 |
| 7,630,640 B2 * | 12/2009 | Kagawa et al. ................... 398/72 |
| 7,660,534 B2 * | 2/2010 | Al-Chalabi ...................... 398/171 |
| 7,725,033 B2 * | 5/2010 | Nakamoto ....................... 398/95 |
| 2006/0165412 A1 * | 7/2006 | Jung et al. ......................... 398/71 |
| 2006/0232848 A1 * | 10/2006 | Xu et al. .......................... 359/325 |

OTHER PUBLICATIONS

J. Zhang, "An Optical FSK Transmitter Based on an Integrated DFB Laser-EA Modulator and its Application in Optical Labeling", IEEE Photonics Technology Letters, vol. 15, No. 7, Jul. 2003.*

* cited by examiner

*Primary Examiner* — Shi K Li

(74) *Attorney, Agent, or Firm* — Conley Rose, P.C.; Grant Rodolph; Jonathan K. Polk

(57) ABSTRACT

A passive optical network (PON) component comprising a first coupler, a second coupler in communication with the first coupler via a plurality of communication paths, a delay module located on one of the communication paths, and a balanced detector in communication with the second coupler. The disclosure includes a method comprising receiving a plurality of optical signals from a plurality of optical network units (ONUs), wherein each ONU is associated with an optical frequency differential, copying at least some of the optical signals, delaying one of the optical signals or the copied optical signals, and producing a radio frequency (RF) signal based on at least one of the optical signals and at least one of the copied optical signals. Also included is a PON component comprising a processor configured to implement a method comprising transmitting an optical signal using an optical frequency differential.

20 Claims, 4 Drawing Sheets

HIGH CAPACITY OPTICAL FREQUENCY DIVISION MULTIPLE ACCESS PASSIVE OPTICAL NETWORK

CROSS-REFERENCE TO RELATED APPLICATIONS

The present application claims priority to U.S. Provisional Patent Application Ser. No. 60/828,115 filed Oct. 4, 2006 by Effenberger and entitled "High Capacity Optical FDMA PON," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." The PON is a point to multi-point network comprised of an optical line terminal (OLT) at a central office, an optical distribution network (ODN), and a plurality of optical network units (ONUs) at the customer premises. Downstream data transmissions may be broadcast to all of the ONUs, while upstream data transmissions may be transmitted to the OLT using various multiple access techniques, such as time division multiple access (TDMA), wavelength division multiple access (WDMA), and frequency division multiple access (FDMA). These multiple access technologies ensure transmissions from the ONUs are received by the OLT without conflicting with one another. The per-user capacity of TDMA-based PONs is inversely proportional to the number of ONUs, partially because the time between one ONU completing its transmission and the next ONU starting transmission, known as the turnaround time, may only allow the transmission speed to scale up to a certain point without any data loss.

WDMA systems use multiple wavelengths of a light to carry multiple data signals. Each of the wavelengths may be assigned to one of the ONUs, allowing for a point-to-point communication path from the ONU to the OLT. The multiple wavelength carrier signals are multiplexed onto an optical fiber before reaching the OLT. The components of a WDMA-based PON system are typically more costly and complex than TDMA PON system components, in part because WDMA PONs use high-precision lasers, optical couplers, optical amplifiers, optical filters, and optical splitters.

SUMMARY

In one aspect, the disclosure includes a PON component comprising a first coupler, a second coupler in communication with the first coupler via a plurality of communication paths, a delay module located on one of the communication paths, and a balanced detector in communication with the second coupler.

In another aspect, the disclosure includes a method comprising receiving a plurality of optical signals from a plurality of ONUs, wherein each ONU is associated with an optical frequency differential, copying at least some of the optical signals, delaying one of the optical signals or the copied optical signals, and producing a radio frequency (RF) signal based on at least one of the optical signals and at least one of the copied optical signals.

In a third aspect, the disclosure includes a PON component comprising a processor configured to implement a method comprising transmitting an optical signal using an optical frequency differential.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides a high capacity optical FDMA PON system. In such a PON system, the ONUs may use an optical frequency differential to transmit signals to the OLT, wherein each ONU may be associated with a unique optical frequency differential. The OLT may copy the incoming signals and delay the copied signals. The original and delayed signals may be sent to an optical detector that produces RF tones based on the interference between the original and delayed signals. The RF tones may be used to create digital signals, which may then be demodulated. The OLT may be preferable to other systems in that it only needs a single optical receiver instead of one optical receiver for each ONU. In addition, the OLT may include control electronics to detect and prevent collisions between ONUs that interfere with each other's transmission.

Figure 1:
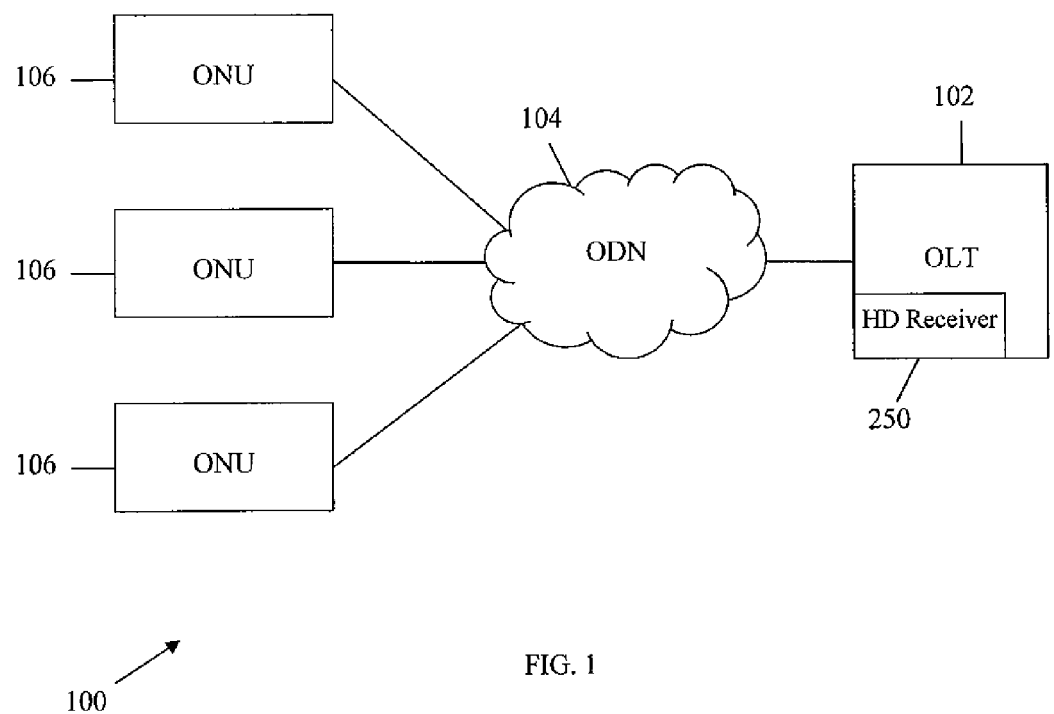
FIG. 1 is a schematic diagram of one embodiment of a PON system.

FIG. 1 illustrates one embodiment of a PON 100. The PON 100 may include an OLT 102, an ODN 104, and a plurality of ONUs 106. The PON 100 is a communications network that does not require any active components to distribute data between the OLT 102 and the ONUs 106. Instead, the PON 100 uses the passive optical components in the ODN 104 to distribute data between the OLT 102 and the ONUs 106. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 102. The OLT 102 may be any device that is configured to communicate with the ONUs 106. Specifically, the OLT 102 may act as an intermediary between another network (not shown) and the ONUs 106 in that the OLT 102 forwards data received from the other network to the ONUs 106, and forwards data received from the ONUs 106 onto the other network. The OLT 102 described herein is typically located at a central location, such as a central office, but may be located at other locations as well. The OLT 102 may include a homodyne time differential (HTD) receiver 250 that is configured to convert optical signals received from the ONUs 106 into digital signals using differential frequency change keying combined with homodyne detection. The HTD receiver 250 is described in further detail below.

Another component of the PON 100 may be the ONUs 106. The ONUs 106 may be any devices that are configured to communicate with the OLT 102 and a customer or user (not shown). Specifically, the ONUs may act as an intermediary between the OLT 102 and the customer in that the ONUs 106 forward data received from the OLT 102 to the customer, and forward data received from the customer onto the OLT 102. In some embodiments, ONUs 106 and optical network terminals (ONTs) are similar, and thus the terms are used interchangeably herein. The ONUs are typically located at distributed locations, such as the customer premises, but may be located at other locations as well.

Another component of the PON 100 may be the ODN 104. The ODN 104 is a data distribution system comprised of optical fiber cables, couplers, splitters, distributors, and/or other equipment known to persons of ordinary skill in the art. In an embodiment, the optical fiber cables, couplers, splitters, distributors, and/or other equipment known to persons of ordinary skill in the art are passive optical components. Specifically, the optical fiber cables, couplers, splitters, distributors, and/or other equipment known to persons of ordinary skill in the art may be components that do not require any power to distribute data signals between the OLT 102 and the ONUs 106. The ODN 104 typically extends from the OLT 102 to the ONUs 106 in a branching configuration as shown in FIG. 1, but may be alternatively configured as determined by a person of ordinary skill in the art.

Figure 2:
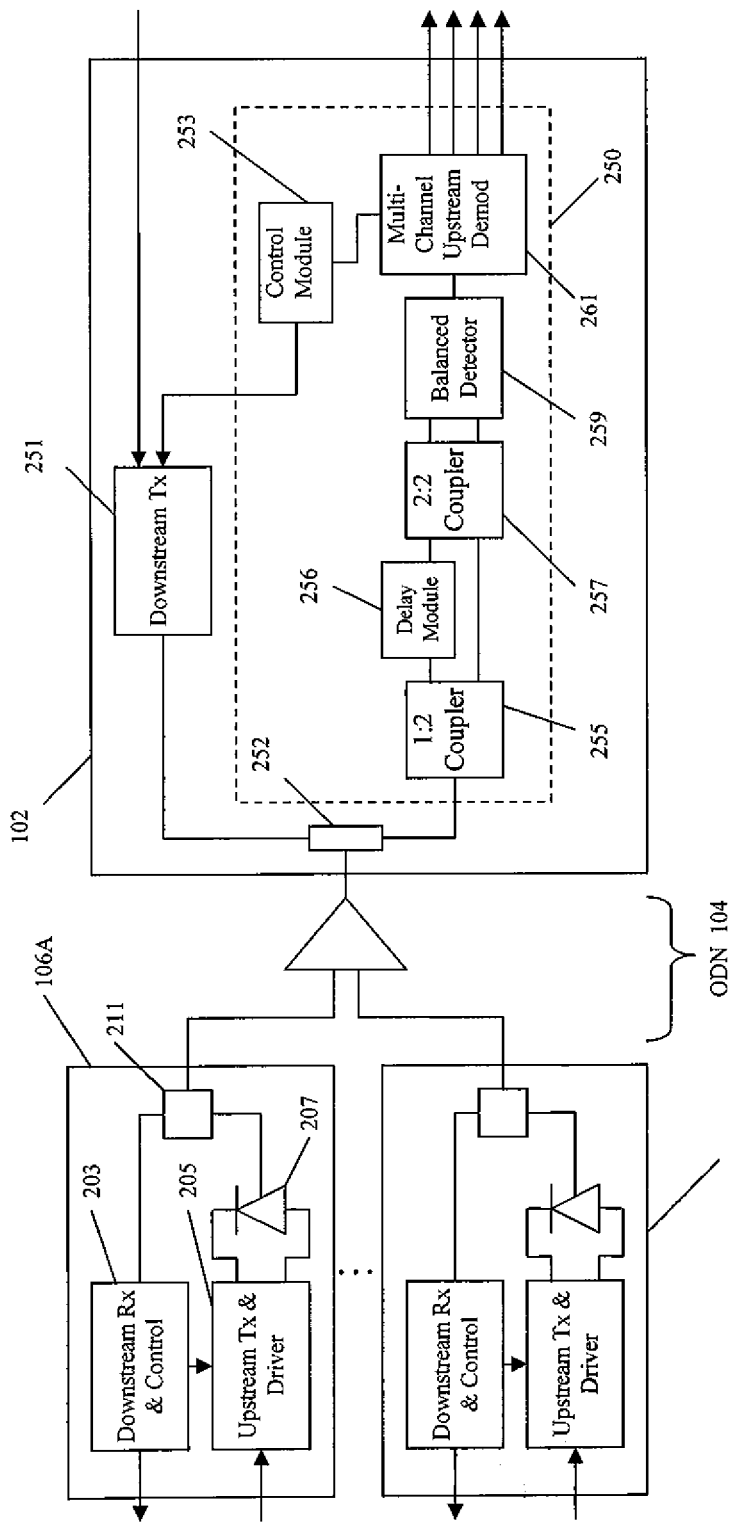
FIG. 2 is a schematic diagram of another embodiment of the PON system.

FIG. 2 illustrates another embodiment of a PON system 200. The PON system 200 may include the OLT 102, multiple ONUs 106A to 106N, and an ODN 104, where the OLT 102 couples to the ONUs 106A-106N via the ODN 104. ONUs 106A-106N may be substantially the same and thus only ONU 106A will be described herein. The ONU 106A may include a downstream receiver and control 203, a wave division multiplexer (WDM) 211, an upstream transmitter and driver 205, and a transmitting laser 207. The WDM 211 may transmit optical signals to the OLT 102 via the ODN 104.

The ONU 106A comprises a downstream receiver and controller 203 coupled to an upstream transmitter and driver 205. Both the downstream receiver 203 and the upstream transmitter 205 are coupled to the WDM 211, which separates downstream communications from upstream communications in the ONU 106A. The downstream receiver and control 203 may include a receiver and a control module, which may receive data from the OLT 102. The optical data may then be forwarded to a coupled networking or computing device (not shown) that uses the data.

The receiver may also receive control commands from the OLT 102. The control commands may be processed by the control module of the receiver and control 203. The control command may come at the time when the PON system 200 starts up or in the middle of normal PON operations. One type of control command may be related to optical frequency adjustment or tuning in that it requests the ONU 106A to adjust the optical frequency at which the upstream transmitter 205 is transmitting signals. In some embodiments, the optical frequency tuning command may provide a frequency or wavelength change and a direction of the change. The frequency change may specify an amount of frequency adjustment to make, which may be measured in Gigahertz (GHz) or nanometers (nm), and the direction of change may indicate a positive or negative frequency or wavelength adjustment. For example, a control command may request that an adjustment of +0.5 GHz be made to a transmission frequency of 19.5 Hz, thereby arriving at a target transmission frequency of 20 GHz. In some other embodiments, the control command may specify a target transmission optical frequency, and the control module of the receiver and control 203 may decide on the amount of adjustment to make in order to reach the target transmission frequency. The optical frequency adjustment may be converted into an amount of adjustment to the input current, voltage, temperature, or other input parameters into the laser 207 to cause the optical frequency adjustment, depending on the system design and laser type. The control command may then be sent to and carried out by the upstream transmitter and driver 205.

The upstream transmitter and driver 205 may take input data from a user device and transmit the input data as optical signals to the OLT 102 at a designated optical frequency differential. The designated optical frequency differential is a unique frequency differential between two optical frequencies and may be used to uniquely identify an ONU. In some embodiments, the frequency differentials are in the range of from about 2 GHz to about 40 GHz. If the frequency differential is $D_a$ for the ONU 106A, then the ONU 106A may transmit at the frequency $f_{base}$ or $(f_{base}+D_a)$, where $f_{base}$ is a base frequency. Specifically, the ONU 106A may transmit at the frequency $(f_{base}+D_a)$ to send a 'one' to the OLT 102, and may transmit at the frequency $f_{base}$ to send a 'zero' to the OLT 102. In an alternative embodiment, ONU 106A may be driven such that the transmission of a 'one' causes a shift in frequency from that which was emitted before, e.g. $f_{base}$ shifts to $(f_{base}+D_a)$ or vice-versa, while the transmission of a 'zero' causes the frequency to be maintained, e.g. $f_{base}$ remains at $f_{base}$ or $(f_{base}+D_a)$ remains at $(f_{base}+D_a)$. The specific frequency or wavelength at which the lasers transmit is allowed to drift because the frequency differential, rather than the frequency, carries the transmitted signal. The upstream transmitter and driver 205 may also implement the optical frequency tuning command by adjusting an input, such as current or voltage, to the laser 207 to arrive at the desired optical frequency differential.

The laser 207 may be an inexpensive, non-temperature-controlled semi-tunable laser, such as a distributed feedback (DFB) laser that may use periodic distributed Bragg reflector (DBR) structures to form the mirrors of the optical cavity. Lasers may be characterized as frequency-locked and non-frequency-locked, according to precision and how tunable the laser is. In general, frequency-locked lasers may transmit an optical signal at a frequency with great precision, high stability and reproducibility. These types of lasers typically have sophisticated temperature controllers, and may be tunable within a wide frequency tuning range. On the other hand, the non-frequency-locked laser may be semi-tunable, may be tuned with a limited tuning range, and/or may lack a heating or cooling apparatus and controller. As such, the non-frequency-locked laser may be subject to the transmission frequency drift if the aforementioned parameters are not maintained constant. Thus, there is a tradeoff between the precision and the cost of the laser 207, where lasers that are more precise cost more. DFB lasers are a type of non-frequency-locked laser, but other types of non-frequency-locked lasers may be used as well.

The OLT 102 may receive transmissions from the ONUs 106A-106N via the ODN 104. Specifically, the OLT 102 receives transmissions at a WDM 252, which separates downstream communications from upstream communications in the OLT 102. The OLT 102 in turn may include a downstream transmitter 251 and the HTD receiver 250. The HTD receiver 250 may include a one-by-two coupler 255, a delay module 256, a two-by-two coupler 257, a balanced detector 259, a multi-channel upstream demodulator 261, and a control module 253. The downstream transmitter 251 may transmit data it receives from the control module 253 and a coupled network (not shown) to the ONU 106A-106N.

The HTD receiver 250 may receive optical signals from multiple ONUs 106A-106N. In some embodiments, the one-by-one coupler 255 may copy a received signal and produce two signals, the original received signal and a copied signal, which are each output on one of two output paths. The delay module 256 may insert a delay on one of these two paths. In some embodiments, the delay module 256 applies a delay of about one-bit to one of the received signal and the copied signal. In other embodiments, a shorter or longer delay may be applied. The two-by-two coupler 257 may receive the received signal and the copied signal from the two separate paths and produce two separate signals to feed into the balanced detector 259. For example, one of the two signals may be a sum of the received signal and the copied signal, and the other signal may be a difference between the received signal and the copied signal.

The balanced detector 259 may receive the two optical signals from the two-by-two coupler 257 and produce RF tones using the two signals. In some embodiments, the balanced detector 259 may have two elements, one element to detect the sum of the received signal and the copied signal, and another element to detect the difference between the received signal and the copied signal. If the ONU 106A sent a 'one', then there is interference between the received signal and the copied signal, and a RF beat-tone is generated. If a 'zero' is sent from the ONU 106A, then there is little or no interference between the received signal and the copied signal, and only a minimal or no RF tone is produced. The balanced detector 259 may detect the presence or absence of the RF beat-tones for all of the ONUs and convert the received optical signals to 'ones' if the RF beat-tones is present and 'zeros' if the RF beat-tone is absent. The RF tones for each ONU may be unique, for example, because each ONU is associated with a unique optical frequency differential. Because this detection method compares the transmitted signal to itself, it negates all of the common mode drift of the ONU transmitter and isolates only the changes in the transmitter that occur at the bit period. The residual drift in a signal bit period is minimal or nonexistent because the bit period is relatively short, e.g. one ns for a one gigabit per second (Gbps) signal. The multi-channel upstream demodulator 261 may then demodulate or separate the multiple digital signals into multiple digital channels and forward the data onto a network coupled with the OLT 102.

The control module 253 may monitor the RF beat tones or frequencies associated with the ONU 106A to 106N and detect a collision between two ONUs. The control module 253 may detect the collisions at the multi-channel upstream demodulator 261 or the balanced detector 257. The control module 253 may also maintain an association or a mapping between an optical frequency differential and a RF tone for each of the ONUs 106A-106N so that each optical frequency differential is unique for the ONU in the PON system 200. The control module 253 may send a control command to an ONU to request that the ONU make an adjustment to its transmission optical frequency and/or optical frequency differential for a variety of reasons. These reasons include, but are not limited to, a collision of transmission frequencies between two ONUs and a need to reconfigure the assignments of transmission optical frequencies to the ONUs, among others. A collision may include a complete or partial overlap or interference between two transmission frequencies. The control module 253 may proactively prevent a collision from taking place by requesting that an ONU makes an adjustment to its transmission frequency when a trend of the ONU moving towards or being substantially near another ONU's transmission frequency is detected. For example, a spacing of at least about 1 GHz may be used between ONU transmitting frequencies, although larger or smaller spacing may also be used. The control module 253 may also decide to reconfigure the PON 100 by re-assigning the optical transmission frequencies for one or more of the ONUs 106A-106N at the system startup time or during the PON system normal operation, as a need to do so arises.

In an embodiment, the disclosed method may utilize 2× Hz of the optical frequency spectrum, where x is the transmission speed in bits per second. Because the optical spectrum is very large, the capacity of the PON may be constrained by the capacity of the balanced detector, For example, if the balanced detector has a bandwidth detection capacity from about 40 GHz to about 100 GHz, then the bandwidth of the PON may be from about 20 Gbps to about 50 Gbps. However, this bandwidth can be increased by combining the disclosed method with a coarse WDM scheme. Specifically, the OLT can be configured with multiple HTD receivers, where each HTD receiver operates within a separate optical frequency band. In such a case, the PON bandwidth capacity would be the product of the HTD receiver detection capacity and the number of HTD receivers.

Figure 3:
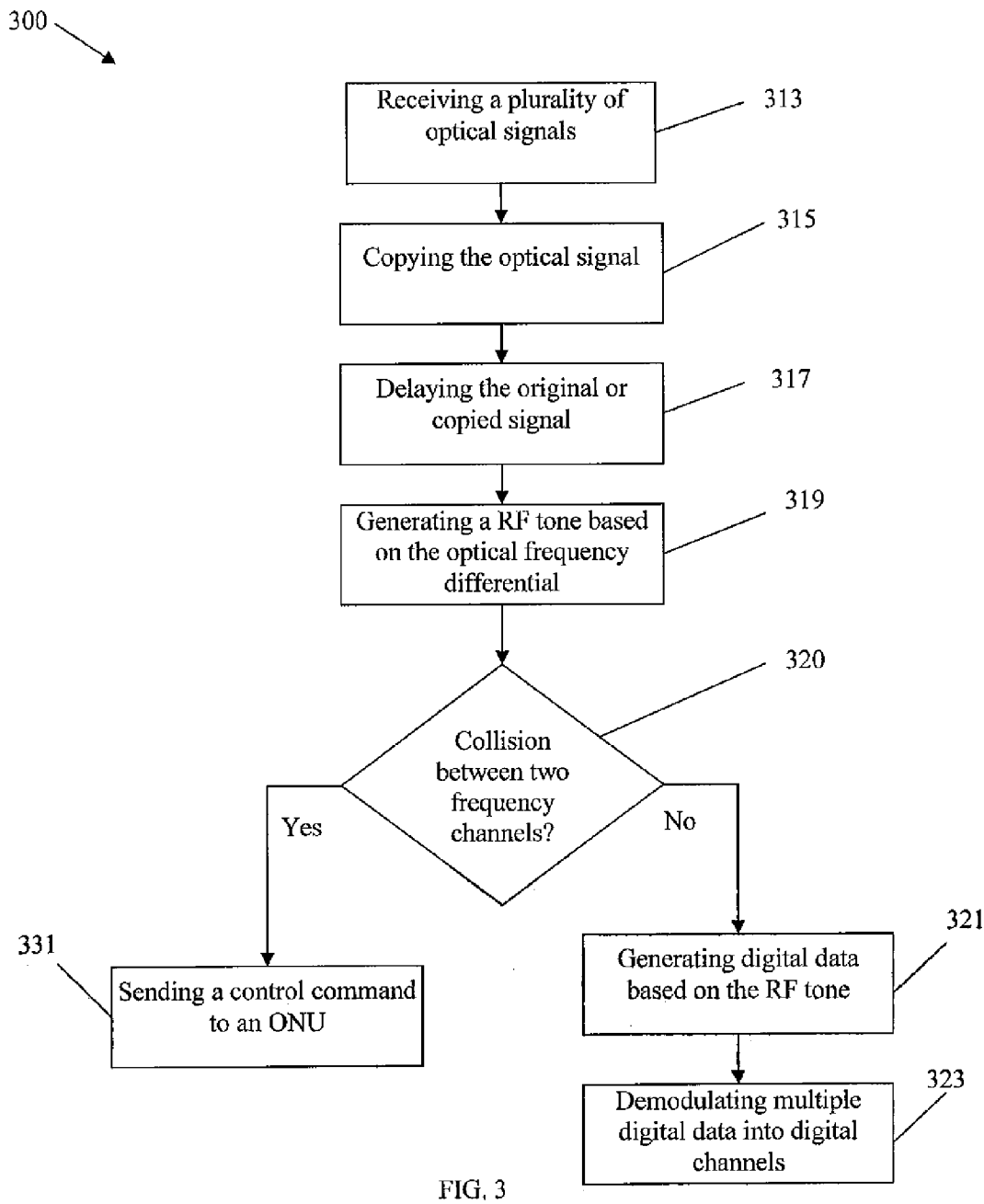
FIG. 3 is a flowchart of one embodiment of a frequency division multiplexing method.

FIG. 3 is a flowchart of one embodiment of a frequency division multiplexing method 300 for a PON system. The method 300 may include receiving a plurality of optical signals at block 313, copying the optical signal at block 315, delaying one of the signals at block 317, generating a RF tone based on the optical frequency differential at block 319, generating digital signals based on RF tone at block 321, and demodulating the digital signals into multiple digital channels at block 323. The method 300 may also include detecting a collision between two transmitting ONUs at block 320, and sending a control command to one of the two involved ONU to change transmitting frequency at block 331. The method 300 may be implemented at any PON component described herein, such as the OLT described above.

The method 300 may begin with the reception of a plurality of optical signals at block 313. Receiving the optical signals may involve receiving the optical signals carried over multiple optical frequency carriers combined within an optical fiber. The method 300 may also comprise the copying of the received optical signal to produce two signals at block 315. The method 300 may further comprise a delay of one of the signals at block 317. In some embodiments, delaying a signal may involve using an optical path difference of one-bit period to produce desired signal delay. The method 300 may also comprise the generation of a RF tone at block 319. Generating a RF tone may include detecting an optical frequency differential, generating a RF beat tone when an optical frequency differential is detected, and generating no RF beat tone when a frequency differential is absent. The original and copied signal may be combined, summed, or subtracted from each other as part of the generation of the RF signal. Detecting an optical frequency differential between the received optical signal and the copied signal may include comparing the two signals and detecting a frequency differential between the two signals. Comparing the two signals may involve using the copy of the received signal as a reference signal and comparing the received signal to the reference signal to detect a frequency differential. Because the comparison is done between the received signal and the copied signal, the interference from common-mode frequency drift is minimized.

The method 300 may also comprise the generation of a digital signal based on the presence or absence of the RF tone at block 321. In some embodiments, the method 300 proceeds to generating the digital signal when no collision is detected between two involved transmitting frequencies. Generating the digital signal may include, for example, generating a 'one' if the RF tone is present and generating a 'zero' if the RF tone is absent or only a minimal RF tone is present. The method 300 may also comprise the demodulation of digital signals into multiple digital channels at block 323. Demodulating the digital signals may include separating the multiple digital signals, after they are recovered from the optical frequency channels as described above, and separating the digital signals into individual upstream digital channels.

In an embodiment, the method 300 may comprise the detection of a collision between two transmitting frequencies at block 320. Since each ONU is allowed to drift across the optical frequency spectrum, the transmitting frequency of one ONU may collide with that of another ONU. Detecting the collision may involve monitoring an optical frequency at which each optical signal is transmitted, and determining whether a threshold of spacing between two transmitting frequencies is crossed. In some embodiments, detecting the collision may take place after a transmitting optical frequency is converted to a distinct, corresponding RF tone. For instance, if two ONUS happen to be on the same or similar optical frequencies, then their corresponding RF tones will interfere and create a spurious beat tone. As such, the OLT may be configured to detect interference among RE tones, e.g. when spurious beat-tones are produced, and instruct one or both of the ONUS involved to shift their optical frequency to avoid the collision. This approach to collision detection may have the advantage of detecting and handling a collision using electronic components which are typically less costly than the corresponding optical components. In another embodiment, detecting a collision may take place at the optical component level where transmitting optical frequencies are directly monitored.

The method may also comprise sending a control command to the involved ONU at 331. Sending the control command may include identifying one of the ONUs whose transmitting frequencies have collided and providing an instruction to one of the ONUs to adjust its transmission frequency. Identifying the offending ONU may involve mapping a RF to an optical frequency, and then to a transmitting ONU. Providing the instruction may also include sending a message to the ONU regarding an optical frequency or wavelength change (including the direction and amount of the change), and sending the command via a control channel between the OLT and an ONU. For example, ONU 106A may be identified as the "offending" ONU and the instruction may include a transmission frequency change in the upward or downward direction. Alternatively, two ONUs may drift towards each other. In this case, control commands may be sent to both the ONUs for transmission frequency adjustment.

Figure 4:
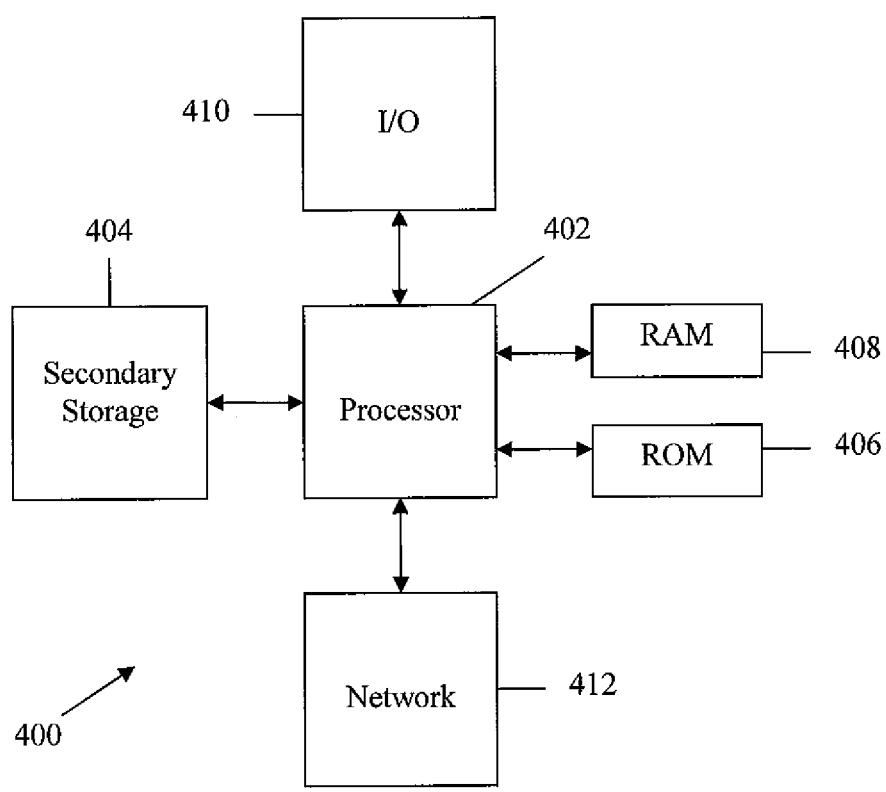
FIG. 4 is a schematic diagram of one embodiment of a general-purpose computer system.

The network described above may be implemented on any general-purpose network component, such as a computer or network component with sufficient processing power, memory resources, and network throughput capability to handle the necessary workload placed upon it. FIG. 4 illustrates a typical, general-purpose network component suitable for implementing one or more embodiments of a node disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) 410 devices, and network connectivity devices 412. The processor may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 608 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An optical line terminal (OLT) comprising:
an optical fiber configured to couple to an optical distribution network (ODN);
a downstream transmitter;
a first coupler;
a wavelength division multiplexer (WDM) coupled to the downstream transmitter, the fiber, and the first coupler, wherein the WDM is not coupled to any other optical components;
a second coupler coupled to the first coupler via two optical communication paths;

a delay module located on only one of the communication paths between the first coupler and the second coupler;

a balanced detector coupled to the second coupler, wherein the balanced detector is configured to receive a plurality of optical signals each of which comprises a unique optical frequency differential, and wherein the optical signals are transmitted at drifting optical carrier frequencies;

a multi-channel upstream demodulator coupled to the balanced detector; and a collision control module coupled to the balanced detector or the multi-channel upstream demodulator.

2. The OLT of claim 1, wherein the first coupler is a one-by-two coupler, and wherein the second coupler is a two-by-two coupler.

3. The OLT of claim 1, wherein the balanced detector is positioned between the second coupler and the multi-channel upstream demodulator.

4. The OLT of claim 3, wherein the control module is configured to detect a collision between two of the optical signals whose carrier frequencies have drifted onto the same wavelength or waveband.

5. The OLT of claim 4, wherein the multi-channel upstream demodulator is configured to receive all of the upstream communications for all optical network units (ONUs) associated with the OLT and ODN.

6. The OLT of claim 4, wherein each optical signal is associated with a unique optical frequency differential comprising a difference between a base frequency ($f_{base}$) and a mark frequency ($f_{base}+D_a$) of the optical signal, and wherein the OLT is configured to identify each optical signal according to its unique frequency differential and not according to its drifting carrier frequency.

7. The OLT of claim 1, wherein the ODN does not comprise a WDM demultiplexer, and wherein the OLT does not comprise any other WDMs.

8. A method comprising:
receiving a plurality of optical signals from a plurality of optical network units (ONUs), wherein each ONU is associated with an optical frequency differential;
copying at least some of the optical signals;
delaying one of the optical signals or the copied optical signals;
producing a radio frequency (RF) signal based on at least one of the optical signals and at least one of the copied optical signals;
detecting a collision between the optical signals from two ONUs; and
instructing an ONU associated with the collision to adjust an optical frequency characteristic.

9. The method of claim 8, further comprising demodulating the RF signals into a plurality of electrical signals, wherein each electrical signal is associated with one of the ONUs.

10. The method of claim 8, further comprising producing a digital one when the RF signal is present and a digital zero when the RF signal associated with one of the ONUs is substantially absent.

11. The method of claim 8, wherein the optical frequency differential associated with each ONU is unique to that ONU.

12. The method of claim 8, wherein delaying one of the optical signals or the copied optical signals comprises delaying one of the optical signals or the copied optical signals for about one bit.

13. The method of claim 8, wherein the optical frequency characteristic comprises the optical frequency differential associated with the ONU.

14. The method of claim 8, wherein the optical frequency characteristic comprises an optical carrier frequency used to transmit the ONU's optical signal.

15. An optical line terminal (OLT) comprising
a transmitter configured to transmit downstream optical signals; and
a receiver comprising a control module and configured to:
receive a multiplexed optical signal comprising a plurality of optical signals, wherein each optical signal is associated with one of a plurality of optical network units (ONUs) according to a frequency differential that is unique for each ONU, and wherein each frequency differential comprises a difference between a base frequency ($f_{base}$) and a mark frequency ($f_{base}+D_a$) of the optical signal transmitted by the corresponding ONU, and
subsequently produce a multiplexed electrical signal comprising a plurality of radio frequency (RF) beat tones based on the multiplexed optical signal, wherein each RF beat tone corresponds with one of the unique frequency differentials,
wherein the control module is positioned between the transmitter and at least one component of the receiver and is configured to send a control command to request an adjustment to a transmission optical frequency, a transmission optical frequency differential, or both.

16. The OLT of claim 15, wherein the optical signals are transmitted by the ONUs according to a differential frequency modulation technique such that a 'one' is represented by shifting a transmitted frequency from a first frequency to a second frequency and a 'zero' is represented by maintaining the transmitted frequency at the first frequency, and wherein the first frequency is the frequency that was transmitted during a preceding bit slot.

17. The OLT of claim 16, wherein the components are further configured to detect a collision between a first optical signal and a second optical signal by detecting a spurious beat tone in the multiplexed electrical signal, and wherein the spurious beat tone is produced by an interference between a first RF beat tone corresponding to the first optical signal and a second RF beat tone corresponding to the second optical signal.

18. The OLT of claim 17, wherein at least some of the plurality of optical signals drift between optical channels or passbands, and wherein the components are further configured to adjust the $f_{base}$ of the first optical signal's base frequency in response to detecting the spurious beat tone.

19. The OLT of claim 17, wherein the components are further configured to:
detect the spurious beat tone by monitoring the multiplexed electrical signal, and
adjust the first optical signal's frequency differential in response to detecting the spurious beat tone.

20. The OLT of claim 17, wherein the components are further configured to demultiplex the multiplexed electrical signal according to the RF beat tones subsequent to producing the multiplexed electrical signal, and wherein the multiplexed optical signal is neither demultiplexed nor demodulated before the multiplexed electrical signal is produced.

* * * * *

UNITED STATES PATENT AND TRADEMARK OFFICE
CERTIFICATE OF CORRECTION

PATENT NO. : 8,824,889 B2  
APPLICATION NO. : 11/852472  
DATED : September 2, 2014  
INVENTOR(S) : Frank J. Effenberger It is certified that error appears in the above-identified patent and that said Letters Patent is hereby corrected as shown below:

In the Claims,

Column 9, Line 29, Claim 6 should read:

The OLT of claim 5, wherein each optical signal is associated with a unique optical frequency differential comprising a difference between a base frequency ($f_{base}$) and a mark frequency ($f_{base} + D_a$) of the optical signal, and wherein the OLT is configured to identify each optical signal according to its unique frequency differential and not according to its drifting carrier frequency.

Column 10, Line 7, Claim 15 should read:

An optical line terminal (OLT) comprising:  
a transmitter configured to transmit downstream optical signals; and  
a receiver comprising a control module and configured to:  
receive a multiplexed optical signal comprising a plurality of optical signals, wherein each optical signal is associated with one of a plurality of optical network units (ONUs) according to a frequency differential that is unique for each ONU, and wherein each frequency differential comprises a difference between a base frequency ($f_{base}$) and a mark frequency ($f_{base} + D_a$) of the optical signal transmitted by the corresponding ONU, and  
subsequently produce a multiplexed electrical signal comprising a plurality of radio frequency (RF) beat tones based on the multiplexed optical signal, wherein each RF beat tone corresponds with one of the unique frequency differentials,  
wherein the control module is positioned between the transmitter and at least one component of the receiver and is configured to send a control command to request an adjustment to a transmission optical frequency, a transmission optical frequency differential, or both.

Signed and Sealed this  
Second Day of December, 2014

Michelle K. Lee  
*Deputy Director of the United States Patent and Trademark Office*